United States Patent [19]  [11] Patent Number: 4,858,392
Beck et al.  [45] Date of Patent: Aug. 22, 1989

[54] DEVICE FOR CLAMPING A SAW BLADE TO A SAW WORKING MACHINE

[75] Inventors: Ernst Beck, Maselheim; Fritz Riehlein; Peter Lenard, both of Biberach an der Riss, all of Fed. Rep. of Germany

[73] Assignee: Vollmer Werke Maschinenfabrik GmbH, Fed. Rep. of Germany

[21] Appl. No.: 183,913

[22] Filed: Apr. 20, 1988

[30] Foreign Application Priority Data

Apr. 21, 1987 [DE] Fed. Rep. of Germany ....... 3713407

[51] Int. Cl.⁴ .............................................. B24B 19/00
[52] U.S. Cl. ................................ 51/218 R; 51/218 T; 76/78 A
[58] Field of Search ................. 51/218 R, 218 T, 225, 51/22 I, 216 R, 217 R; 76/78 R, 78 A, 37, 31; 269/25, 74, 82, 254 R

[56] References Cited

FOREIGN PATENT DOCUMENTS 44415 7/1887 Fed. Rep. of Germany ..... 76/78 A

Primary Examiner—Frederick R. Schmidt
Assistant Examiner—Maurina Pachuba
Attorney, Agent, or Firm—Wallenstein, Wagner & Hattis

[57] ABSTRACT

A flap (14) is mounted on a machine frame (10) for movement to and fro between an open position and a closure position. Opposite a first clamping jaw (22) supported on the machine frame (10) there is a second clamping jaw (24) supported on the flap (14) in order in the clamped position thereof to clamp a saw blade (30) between said second jaw (24) and the first clamping jaw (22). A locking member (48) movable to and fro between a disengaged position and an engaged position permits in its disengaged position opening of the flap (14) and in its engaged position secures the flap (14) in the closure position thereof. The locking member (48) is mounted on the flap (14) and adapted to engage behind a support body (56) disposed on the machine frame (10). A grip (42) for moving the locking member (48) is mounted likewise on the flap (14) for movement to and fro between a rest position and an actuating position. The grip (42) permits in its rest position engagement of the locking member (48) and on a movement of the grip (42) into an actuating position allows the locking member (48) to disengage.

10 Claims, 6 Drawing Sheets

4,858,392

DEVICE FOR CLAMPING A SAW BLADE TO A SAW WORKING MACHINE

The invention relates to a device for clamping a saw blade to a saw working machine comprising a flap which is mounted on a machine frame movable to and fro between an open position adn a closure position, a first clamping jaw which is supported on the machine frame, a second clamping jaw which is supported on the flap for clamping in the closure position thereof a saw blade between said second clamping jaw and the first clamping jaw, a locking member which is movable to and fro between a disengaged position and an engaged position and in its disengaged position permits the opening of the flap but in its engaged position secures the flap in the closure position thereof, and a grip for moving the locking member.

Known devices of this type (cf. for example the prospectus of Applicants "CanaS/CanaSL" of August 1984) are attached to special automatic machines for sharpening cutting-out saws and a wide band saws and have a flap which is pivotal about a first horizontal axis. Said first axis extends parallel to the longitudinal direction of the band saw which is to be clamped in the device. The associated locking bar or member is mounted on the machine frame pivotally about a second horizontal axis which extends at a right-angle to the first axis and in the closure position of the flap can be pivoted upwardly such that said locking member runs with its free end onto a curve-shaped rib which is formed on the flap. For pivoting the locking member a grip in the form of a ball head is secured to the free end thereof. The locking member is formed by a leaf spring pack so that it holds the flap in its closure position with a predetermined force.

Such known devices require two hands for their operation. When a saw blade has been inserted and the flap has been pivoted upwardly into its closure position it must be held fixed with one hand whilst the locking bar is pivoted upwardly and subjected to flexural stress by its free end running onto the rib of the flap. Conversely, to release the saw blade the flap must be held fixed with one hand whilst the locking member is pivoted downwardly with the other hand before the flap is then pivoted downwardly with the first hand or with both hands. If the two movements of the two hands are not properly coordinated with each other there is a danger of injury. For example, the flap can swing down with great force and strike the user when the latter bends down to reach with one hand the grip secured to the free end of the locking member and omits to hold the flap properly with the other hand.

The invention is based on the problem of further developing a device for clamping a saw blade to a saw working machine, in particular a machine for sharpening cutting-out saws or wide band saws, in such a manner that without any danger for the user it can be actuated optionally with one hand or by simple and identical movements of both hands.

The problem is solved in a device of the type described at the beginning in that the locking member is mounted on the flap and adapted to engage behind a support body disposed on the machine frame and the grip is likewise mounted on the flap and adapted to be moved to and fro between a rest position and an operating position and in its rest position permits engagement of the locking member but on a movement of the grip into its actuating position allows the locking member to disengage.

Since according to the invention both the locking member and the grip are mounted on the flap the user only needs to hold the grip in order to operate the flap and the locking member consecutively. This can be done generally with one hand so that the user has the other hand free for example to initiate an advancing movement and thus determine whether the clamping of the saw blade is too loose or too firm.

Preferably, on the support body a ramp is formed which on closure of the flap with the grip in the rest position forces the locking member into the disengaged position and allows it to engage only behind the support body. This further facilitates the handling because the user on closing the flap can initially optionally hold the grip in the rest or in the actuating position; he does not need to bring the grip into the rest position until the flap is closed and in said position said flap permits the engagement of the locking member behind the support body.

It is further expedient for the locking member and grip to be pivotally mounted with a joint bearing pin on the flap. This gives a particularly simple transmission path of the forces applied to the grip for pivoting the flap on the one hand and for actuating the locking member on the other hand.

The handling is further simplified if the bearing pin extends parallel to an axis about which the flap is pivotable with respect to the machine frame.

In a further development of the embodiments described above the locking member is pivotal on the bearing pin in the opposite sense to the grip and on the flap a rocker is additionally mounted in such a manner that by pivoting the grip from its rest position to its actuating position the rocker is pivotal out of an inoperative position into a support position and thereby allows the locking member to disengage.

The grip is preferably mounted on the bearing pin and the latter has an eccentric on which the locking member is mounted. This makes it possible by pivoting the grip not only to pivot the locking member between its engaged position and its disengaged position but additionally to bias the locking member in its engaged position.

A reliable engagement of the locking member in the position of the flap and of the grip intended therefor can be ensured by the weight of the locking member. Preferably however the locking member is loaded by a spring in the sense of movement into its engaged position.

Finally, it is advantageous for the flap to be biased by a spring in the sense of a movement into its closure position and thereby relieved of at least part of its weight.

An example of embodiment of the invention will be explained hereinafter with the aid of schematic drawings which show further details and in which.

Figure 1:
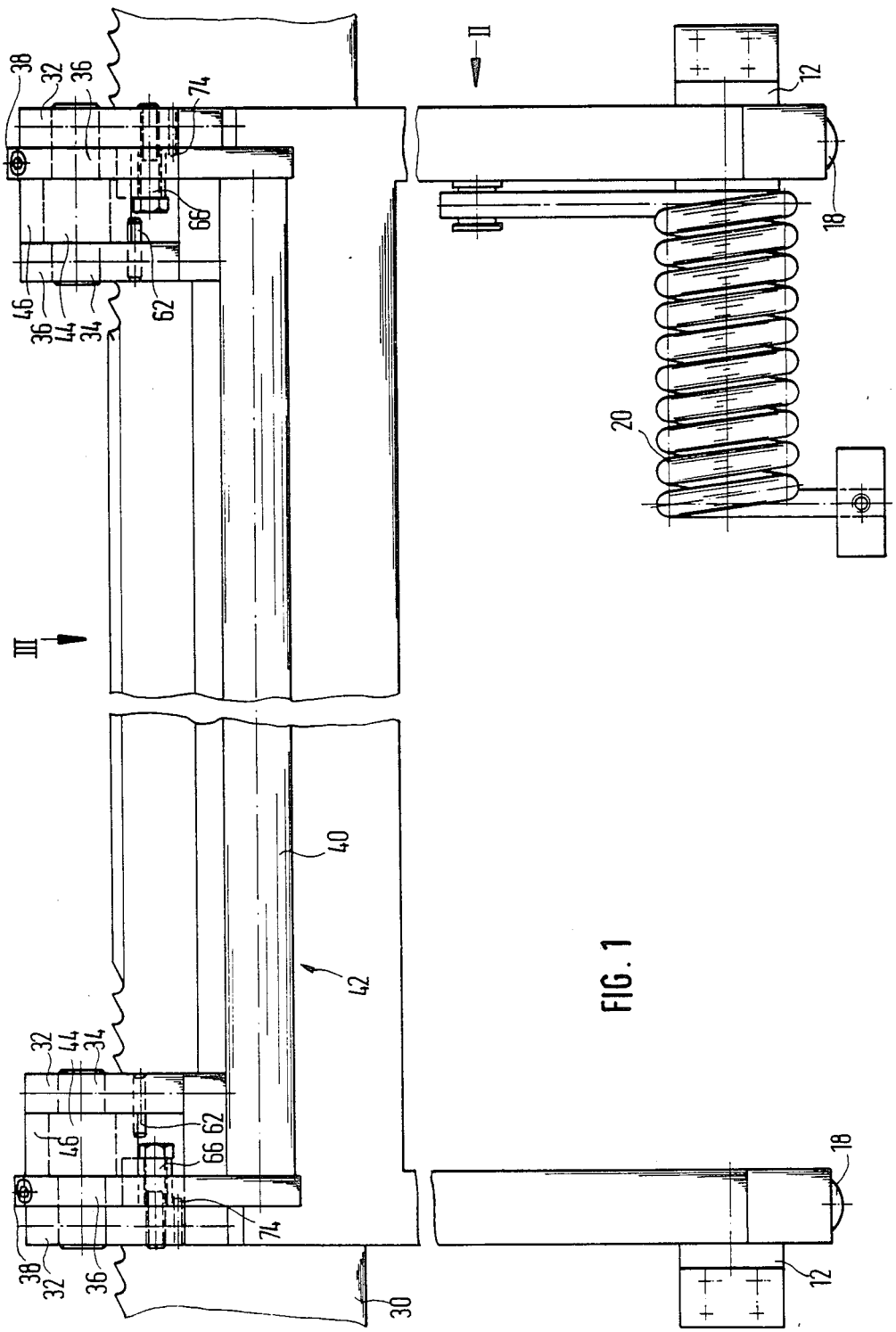
FIG. 1 is a front elevation of a device for clamping a saw blade.
Figure 2:
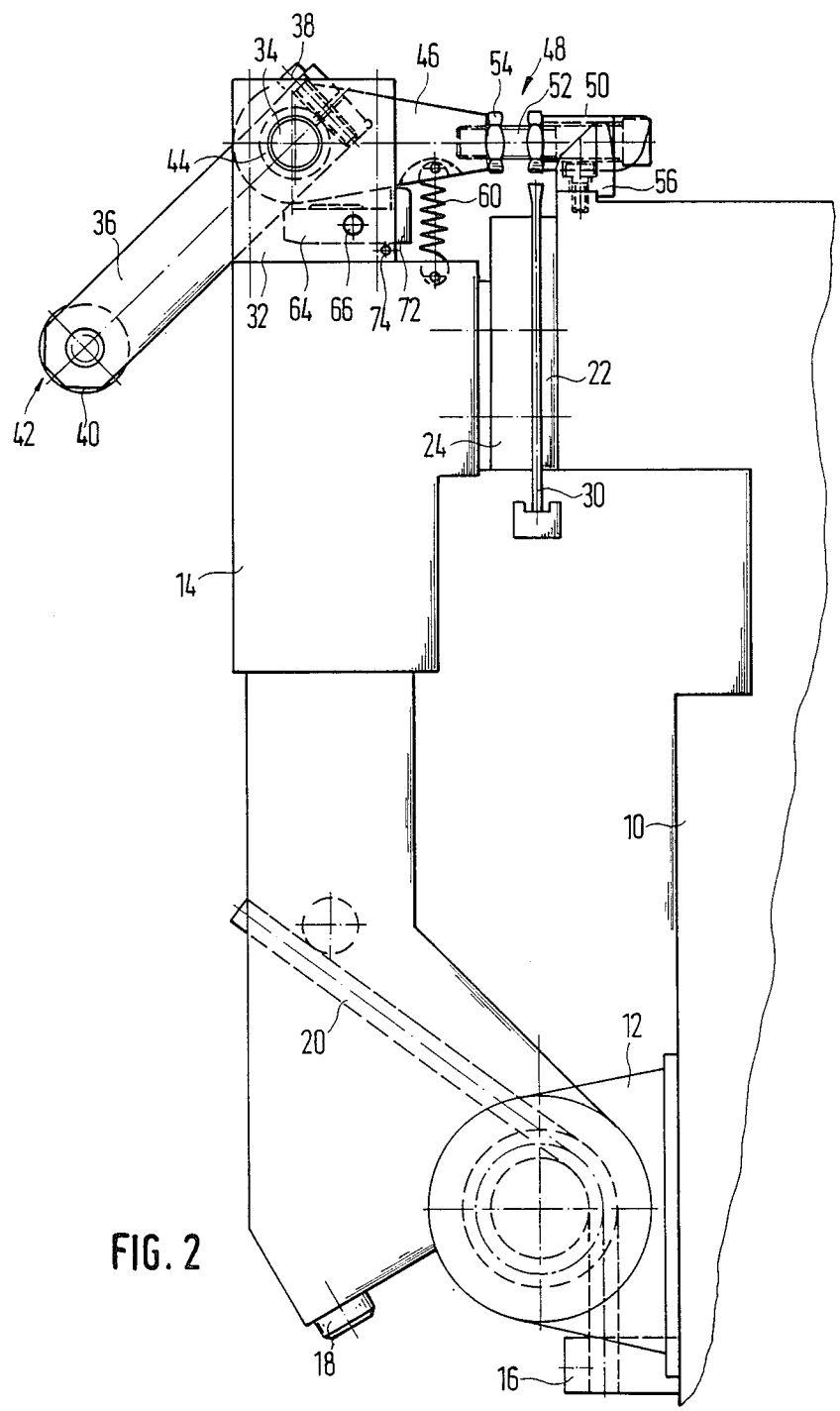
FIG. 2 is a side elevation in the direction of the arrow II of FIG. 1.
Figure 3:
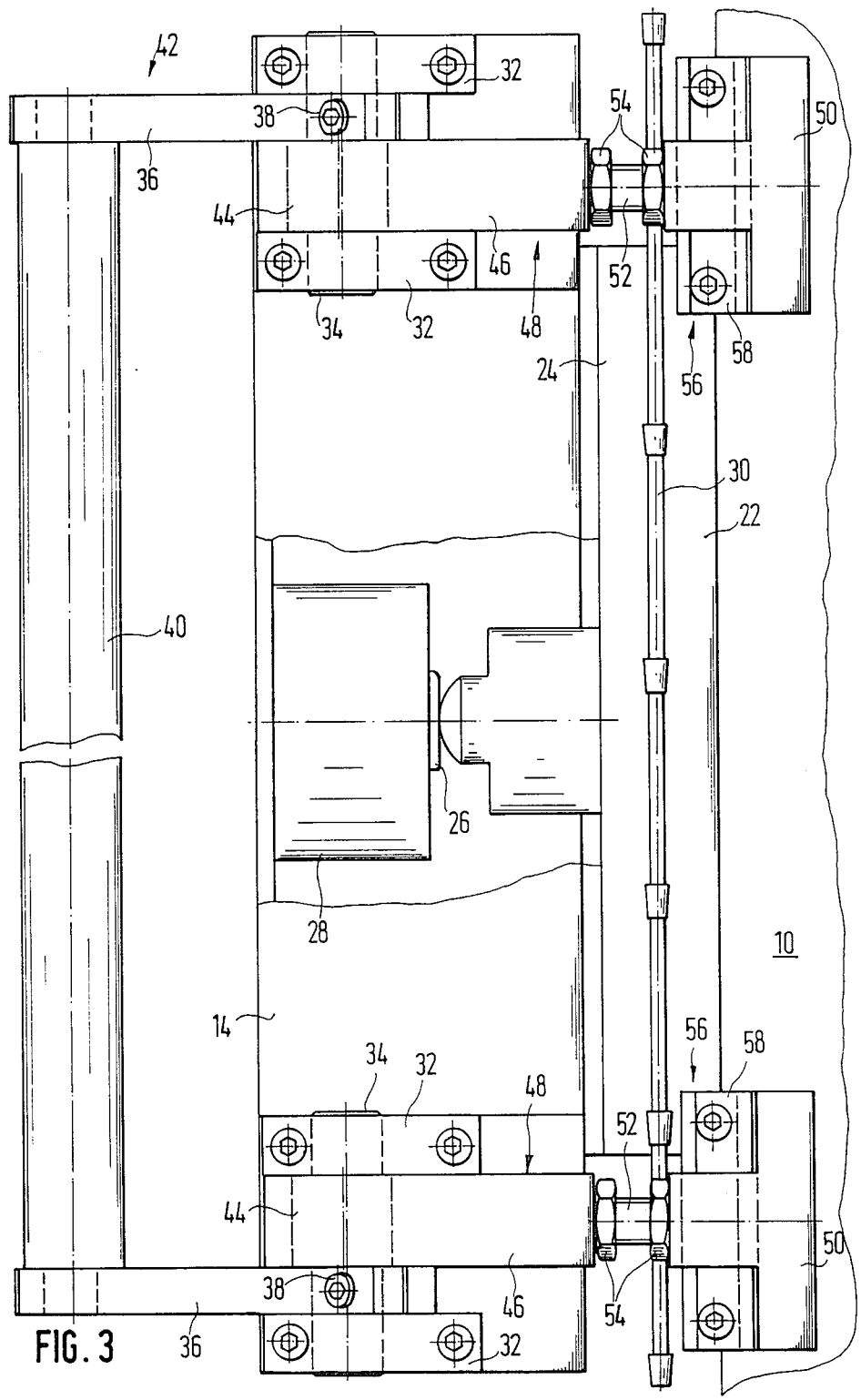
FIG. 3 is the associated plan view in the direction of the arrow III of FIG. 1.
Figure 4:
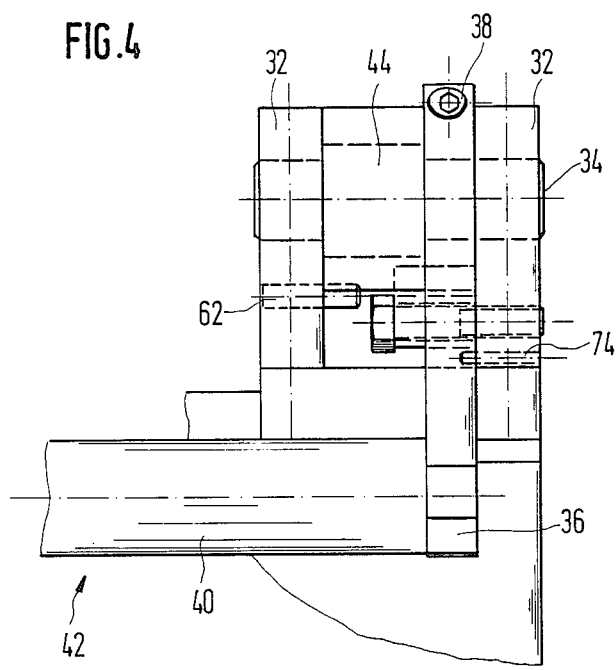
FIG. 4 is an enlarged detail of FIG. 1.

The drawings show parts of a machine frame 10 belonging to a machine for sharpening band saws. Mounted on the machine frame 10 are bearing pedestals 12 on which a flap 14 is pivotally mounted about a horizontal axis A. Formed on each of the bearing pedestals 12 is a stop 16 which together with a respective stop 18 mounted on the flap 14 limits the pivot range of the flap 14 in such a manner that the latter can be pivoted out of the vertical closure position shown through about 60° downwardly into an open position. The flap 14 is supported by flexural springs 20 at the two bearings pedestals 12 in such a manner that it remains stationary in any desired intermediate position between the open position and the closed position if no further outer force is exerted on it.

Mounted on the machine frame 10 is a first clamping jaw 22; opposite the latter there is a second clamping jaw 24 which is displaceably guided on the flap 14 and is supported on a piston 26 in a hydraulic cylinder 28 secured to the flap 14. Bewteen the two clamping jaws 22 and 24 a saw blade 30 can be clamped with a force depending on the pressure in the hydraulic cylinder 28 when the flap 14 is locked as illustrated in its closure position.

Between each of two pairs of bearing pedestals 32 a bearing pin 34 is mounted at the edge of the flap 14 which is remote from the bearing pedestals 12 and is the upper edge in the closure position. The two bearing pins 14 are rotatable about a common axis B which is parallel to the pivot axis A. Clamped to each of the two bearing pins 34 by means of a screw 38 is an arm 36. Secured to the two arms 36 is a connecting rod 40 which is parallel to the axis B and which together with said arms forms a grip 42 for pivoting and locking the flap 14.

Each of the two bearing pins 34 has an eccentric 44 which is formed between the two associated bearing pedestals 32 and the axis C of which extends at a slight distance parallel to the axis B. A base portion 46 of each locking member 48 is mounted freely rotatably on each of the eccentrics 44. Each locking member 48 has a T-shaped head portion 50 which is connected to the associated base portion 46 by a threaded portion 52 at an adjustable distance apart. The threaded portion 52 of each locking member 48 is locked by two nuts 54. Associated with each locking member 48 is a support member 56 which is mounted on the machine frame 10 and which has the form of an upwardly open fork and comprises a ramp 58 at its side facing the base portion 46. Each of the two locking members is biased by a spring 60, a tension spring in the example illustrated, downwardly towards a stop 62 secured on the flap 14.

In the vicinity of each of the two bearing pins 34 a two-armed rocker 64 is mounted on a bearing pin 66 whose axis D extends parallel to the aformentioned axes A, B and C. In an end region of each of the two rockers 64 a hardened sliding face 68 is formed with which is associated a cam-like projection 70 on the adjacent arm 36 of the grip 42. At the other end region of each rocker 64 a support 74 is formed which is able to press the associated locking member 48 upwardly and hold said member at the top. The pivot range of each rocker 64 is limited by at least one stop 74 mounted on the flap 14.

Figure 5:
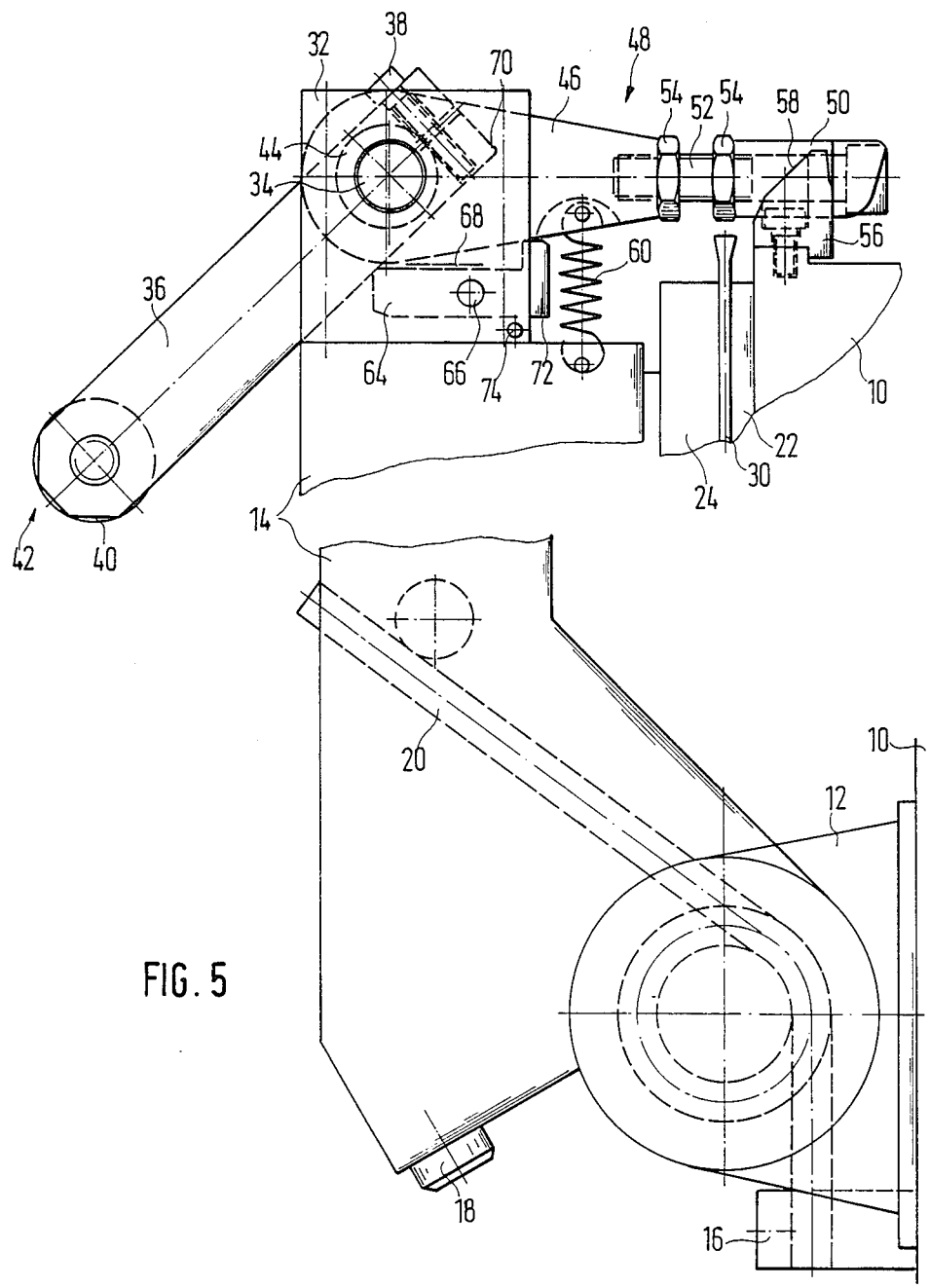
FIG. 5 is an enlarged detail of FIG. 2 with a clamped saw blade.
Figure 6:
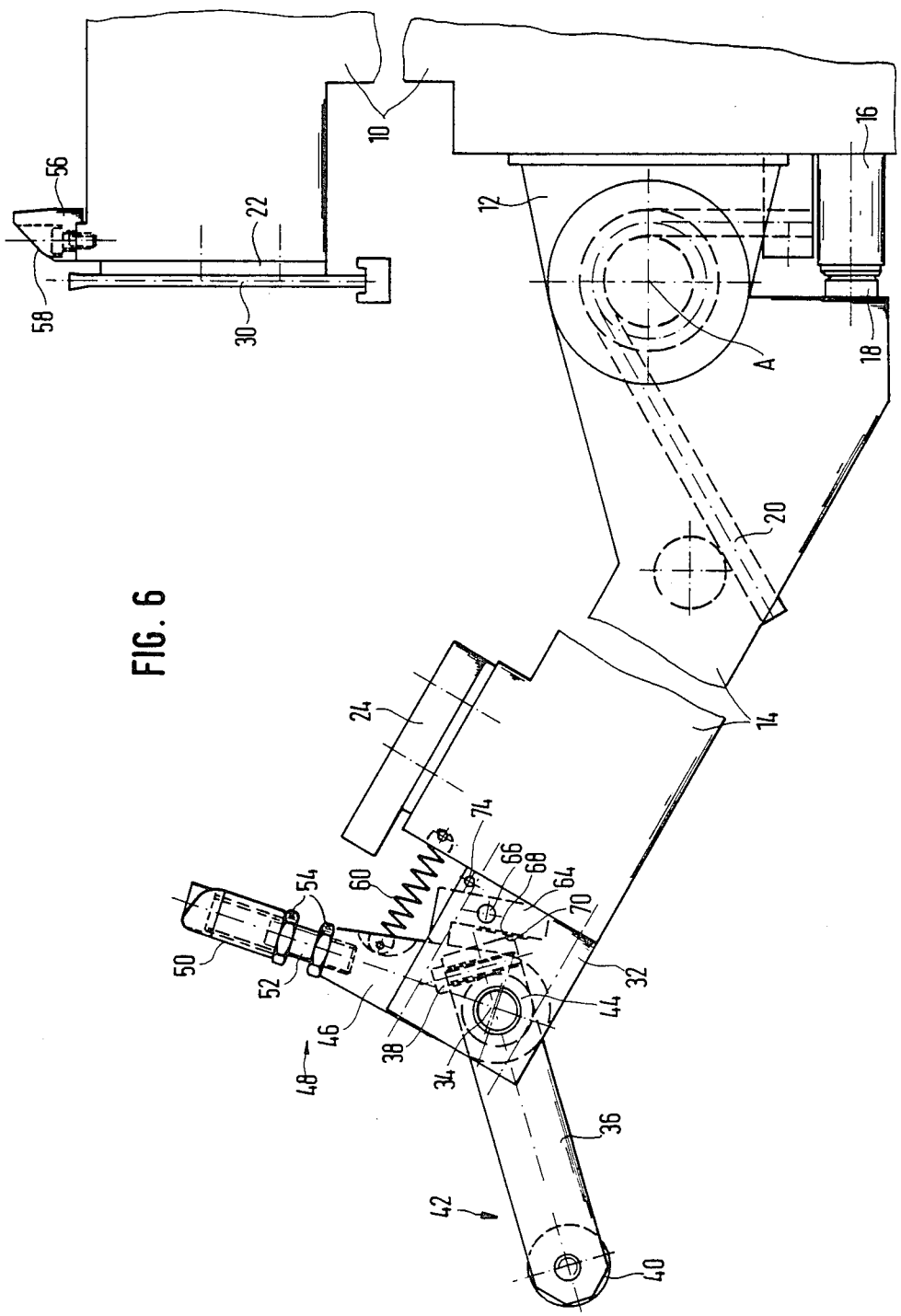
FIG. 6 is the same detail with the saw blade released.

The grip 42 can be moved up and down between a lower rest position shown particularly clearly in FIG. 5 and an upper actuating position shown in FIG. 6. When the grip 42 is pivoted upwardly out of the rest position in the actuating position the cam-like projections 70 of the arms 36 slide on the slide faces 68 formed on the rockers 64 and press said faces downwardly. As a result the supports 72 move upwardly and each of them presses the associated locking member 48 upwardly.

If the locking members 48 were previously engaged behind the respective associated support body 56 as illustrated in FIG. 5 said locking members 48 now leave this engaged position and move to their disengaged position shown in FIG. 6. In the engaged position of the two locking members 48 the flap 14 can be pivoted by means of the grip 42 in such a manner that the clamping jaw 24 moves away from the clamping jaw 22 and the saw blade 30 can consequently be freely moved and when working thereof is finished replaced by another saw blade. The user can open the flap 14 to a greater or lesser degree; generally, it will be necessary to move the flap 14 completely into its open position only for replacing the saw blade 30.

If the flap 14 is to be closed again it is pivoted upwardly by means of the grip 42; it is immaterial whether the grip assumes its lower rest position or its upper actuating position. If the grip 42 assumes its rest position each of the locking members 48 is held by its spring 60 in engagement with its stop 62 until its head portion 50 slides onto the associated ramp 58 and the locking member 48 is thereby lifted over the associated support body 56. If however during the downward pivoting of the flap 14 the grip 42 is held in its upper position, the actuating position, the head portions 50 of the locking members 48 readiy move over the support bodies 56 and do not engage behind the latter until the grip 42 is pivoted downwardly into its rest position. In each case it is readily possible to carry out all the necessary movements of the device with one hand.

We claim:

1. In a device for clamping a saw blade to a saw working machine having a flap which is mounted on a machine frame to be movable to and fro between an open position and a closure position, a first clamping jaw which is supported on said machine frame, a second clamping jaw supported on said flap and disposed for confrontingly clamping in the closure position of said flap, a saw blade between said second clamping jaw and said first clamping jaw, releasable locking means including a locking member for securing said flap in said closure position and movable to and fro between a disengaged position permitting the opening of said flap and an engaged position securing said flap in said closure position, and grip means operatively coupled to said locking means for moving said locking member between said engaged and disengaged positions, the improvement wherein:

said locking member is mounted on said flap and is configured to engage with a support body disposed on the machine frame; and said grip means is mounted on said flap so that movement of said grip means with respect to said frame urges said flap between said open and closure flap positions and is mounted for movement with respect to said flap to and fro between a rest position moving said locking member to said engaged position and an actuating position operating said locking member to said disengaged position.

2. The device according to claim 1 wherein on said support body a ramp is formed configured for engagement with said locking member and which on closure of said flap with said grip means in said rest position momentarily forces said locking member into said disengaged position and thereafter releases it to permit engagement behind said support body upon final closure of said flap.

3. The device according to claim 1 or 2 wherein said locking member and said grip means are pivotally mounted on a common bearing pin mounted on said flap.

4. The device according to claim 3 wherein said flap is mounted for pivotal motion with respect to said machine frame about a flap rotation axis and said bearing pin extends parallel to said flap rotation axis.

5. The device according to claim 3 further including a rocker mounted to coupler movement of said grip means to said locking member in such a manner that by pivoting said grip means from its rest position to its actuating position said rocker is pivotal out of an inoperative position into a support position to force said locking member to said disengaged position.

6. The device according to claim 3 wherein said grip means is mounted on said bearing pin and said locking means comprises an eccentric driven by rotation of said grip means about said bearing pin and to which said locking member is coupled so that after closure of said flap and operation of said grip means from said actuating to said rest position said locking member is drawn into firm engagement with said support body.

7. The device according to any one of claims 1, 2, 3, 4, 5 or 6 wherein the locking member is loaded by a locking spring towards said engaged position.

8. The device according to any one of claims 1, 2, 3, 4, 5 or 6 wherein said flap is biased by a flap spring towards said closure position and thereby relieved of at least part of its weight.

9. In a device for clamping a saw blade to a saw working machine having a flap which is mounted on a machine frame to be movable to and fro between an open position and a closure position, a first clamping jaw which is supported on said machine frame, a second clamping jaw supported on said flap and disposed for confrontingly clamping in the closure position of said flap a saw blade between said second clamping jaw and said first clamping jaw, releasable locking means including a locking member for securing said flap in said closure position and movable to and fro between a disengaged position permitting the opening of said flap and an engaged position securing said flap in said closure position, and grip means operatively coupled to said locking means for moving said locking member between said engaged and disengaged positions, the improvement wherein:

said locking member is mounted on said flap and is configured to engage with a support body disposed on the machine frame;

said grip means is mounted on said flap so that movement of said grip means with respect to said frame urges said flap between said open and closure flap positions and mounted for movement with respect to said flap to and fro between a rest position moving said locking member to said engaged position and an actuating position operating said locking member to said disengaged position;

said support body has a ramp thereon configured for engagement with said locking member and which on closure of said flap with said grip means in said rest position momentarily forces said locking member into said disengaged position and thereafter releases it to permit engagement behind said support body upon final closure of said flap, said locking member and said grip means being pivotally mounted on a common bearing pin mounted on said flap, said flap being mounted for pivotal motion with respect to said machine frame about a flap rotation axis and said bearing pin extending parallel to said flap rotation axis;

said grip means includes a rocker mounted to couple movement of said grip means to said locking member in such a manner that by pivoting said grip means from its rest position to its actuating position said rocker is pivoted out of an inoperative position into a support positoin to force said locking member to said disengaged position, said grip means being mounted on said bearing pin and said locking means comprising an eccentric driven by rotation of said grip means about said bearing pin and to which said locking member is coupled so that after closure of said flap and operation of said grip means from said actuating to said rest position said locking member is drawn into firm engagement with said support body.

10. The device of claimm 9 further including a locking spring disposed to bias said locking member towards said engaged position.

* * * * *